W. A. HOPKINS.
JUNCTION BOX, RECEPTACLE, AND PLUG FOR ELECTRICAL CONNECTIONS.
APPLICATION FILED NOV. 28, 1908.
965,187.
Patented July 26, 1910.
2 SHEETS—SHEET 1.
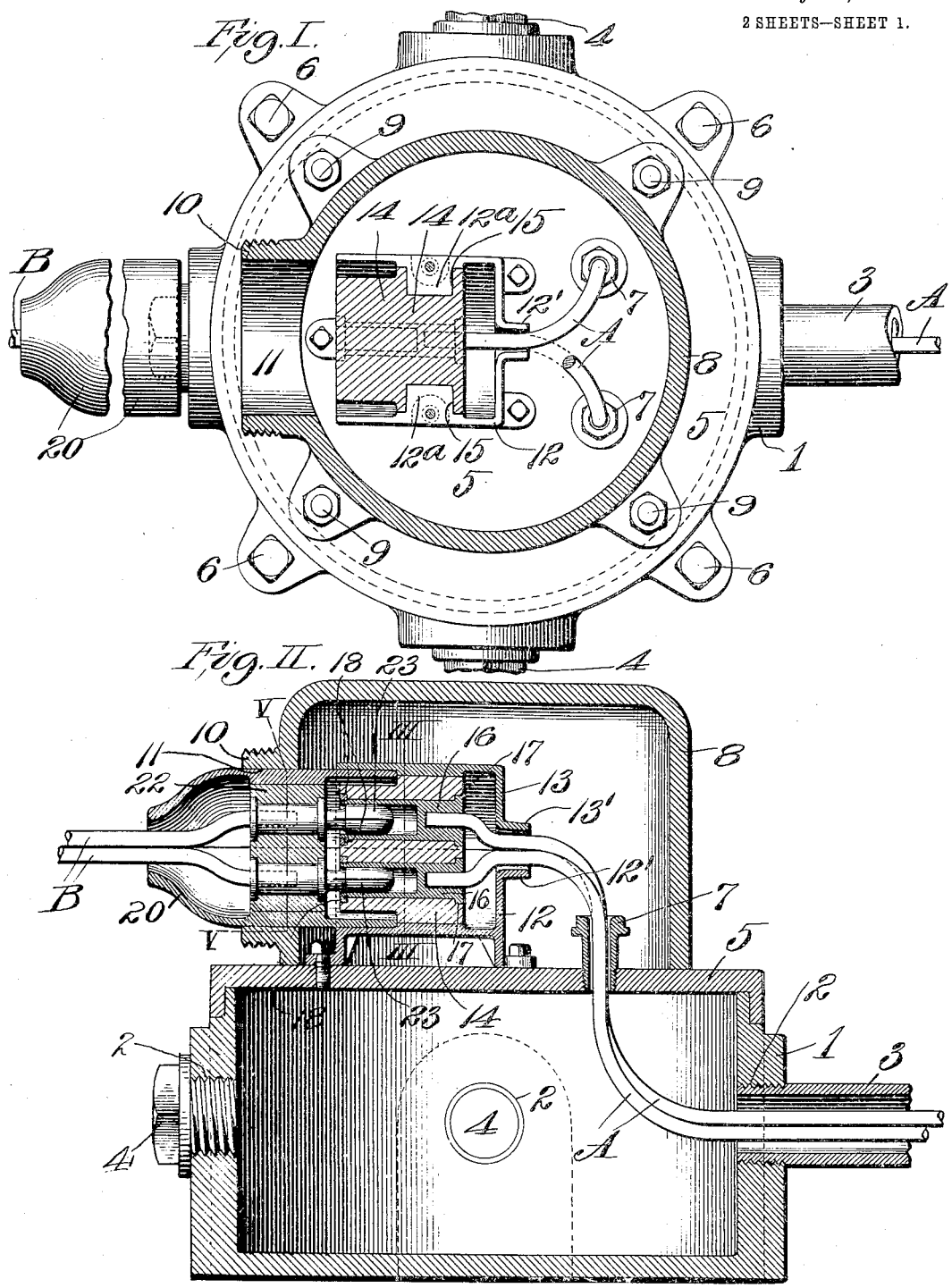
Attest:
Wm. H. Scott.
Hans E. Varney.
Inventor:
W. A. Hopkins,
by George H. Snyder
Atty.

W. A. HOPKINS.
JUNCTION BOX, RECEPTACLE, AND PLUG FOR ELECTRICAL CONNECTIONS.
APPLICATION FILED NOV. 28, 1908.
965,187.
Patented July 26, 1910.
2 SHEETS—SHEET 2.
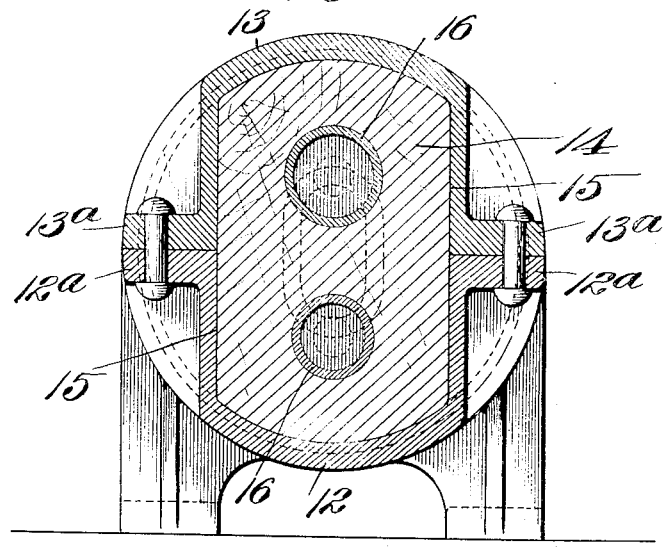
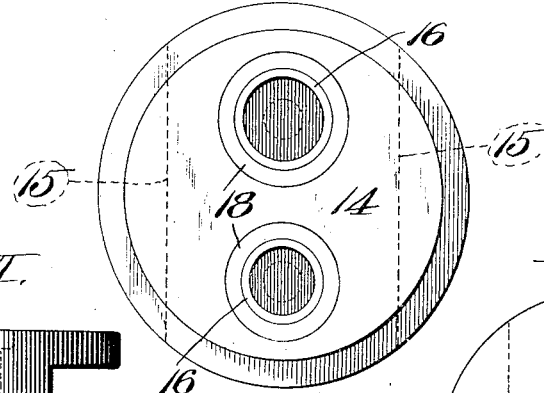
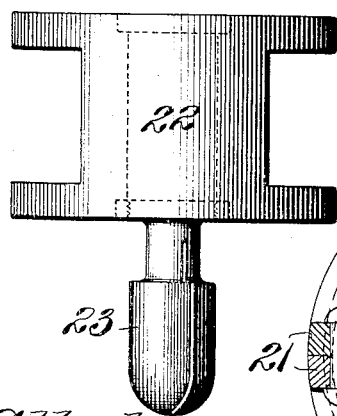
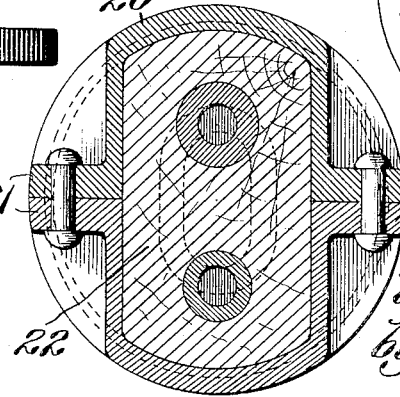
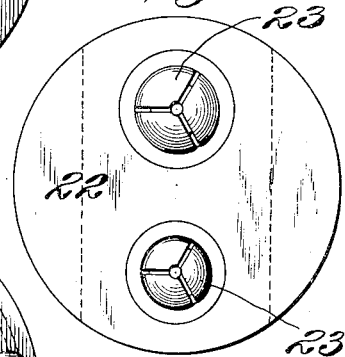
Inventor:
W. A. Hopkins,
by George H. Knight
Atty.
Attest:

UNITED STATES PATENT OFFICE.

WILLIAM A. HOPKINS, OF DECATUR, ILLINOIS, ASSIGNOR TO WARD EQUIPMENT COMPANY, OF NEW YORK, N. Y., A CORPORATION OF NEW YORK.

JUNCTION-BOX, RECEPTACLE, AND PLUG FOR ELECTRICAL CONNECTIONS.

965,187. Specification of Letters Patent. Patented July 26, 1910.

Application filed November 28, 1908. Serial No. 464,887.

*To all whom it may concern:*

Be it known that I, WILLIAM A. HOPKINS, a citizen of the United States of America, residing in Decatur, in the county of Macon and State of Illinois, have invented certain new and useful Improvements in Junction-Boxes, Receptacles, and Plugs for Electrical Connections, of which the following is a full, clear, and exact description, reference being had to the accompanying drawings, forming part of this specification.

My invention relates to a junction box, receptacle, and plug more particularly intended for use in making connections from underground electrical conductors to the conductors associated with the storage batteries of railway cars and through the medium of which said storage batteries are charged to provide for their furnishing electrical energy to the lighting apparatus of the cars. The device may, however, be used to furnish electrical connection other than that particularly referred to.

Figure I is in part a top or plan view and in part a horizontal section of my junction box, receptacle, and plug. Fig. II is a vertical section taken through the junction box, receptacle, and plug. Fig. III is an enlarged vertical cross section taken on the line III—III of Fig. II through the receptacle. Fig. IV is an enlarged end view of the body of the receptacle. Fig. V is an enlarged vertical cross section through the plug, the plane of section being indicated by the line V—V in Fig. II. Fig. VI is an enlarged top plan view of the plug, with its shell removed. Fig. VII is an end view of the plug.

In the accompanying drawings:—1 designates the body or base member of my junction box which is provided with any desirable number of inlets 2 located in its wall and into any one of which may be introduced a conduit pipe 3 through which electrical conductors A extend. When any one of the inlets 2 is unoccupied by a conduit pipe, it is closed by a suitable plug 4.

5 is a lid fitted to the body or base of the junction box and preferably secured thereto by bolts 6 that are inserted through ears projecting from the box body and its lid.

7 designates short upright tubular members seated in the junction box lid 5 and through which the conductors A extend from the body or base of the junction box.

8 designates a housing cap surmounting the junction box lid and secured thereto in any suitable manner, such as by the insertion of screws or bolts 9 through the ears projecting from the lower edge of the housing cap, and into or through the junction box lid. The housing cap 8 is provided with a neck 10 that is preferably screw threaded externally, as seen in Figs. I and II. This neck is machined or ground internally to provide a smooth and true bore 11 which is adapted to receive and guide the plug to be hereinafter described when said plug is introduced into and moved from the neck 10.

Within the housing cap 8 and secured to the junction box lid 5 in any suitable manner is a receptacle housing, which comprises a lower section 12 and top or cap section 13, these sections being provided, respectively, with semicircular neck members that serve to provide a neck 13' through which the conductors A extend into the receptacle casing. The receptacle casing sections are flattened intermediate of their ends at their sides, as seen in Fig. III; and when these sections are assembled, they are held together by rivets or other means that extend through ears 12$^a$ and 13$^a$ projecting outwardly from the flat sides of the sections.

14 is an insulation block that may be of wood, or any other suitable insulating material, and which is incased within the receptacle casing comprising the sections 12 and 13, the said block being recessed at 15 to receive the flattened portions of the casing sections in order that said portions may serve to hold the insulating block from movement within the receptacle casing.

16 are sockets that are mounted in the insulating block 14 and which receive the ends of the conductors A which may be secured in the sockets in any preferable way, such, for instance, as by soldering the conductors to the sockets. Each of the sockets 16 is introduced into an opening provided therefor in the insulating block, and through which the socket extends, and each socket is provided at its rear end with a shoulder 17 adapted to bear against the rear end of the insulating block, and is threaded at its forward end to receive a nut 18 that is adapted to bear against the forward end of the insulating block and act to hold the socket in said block. The cavities in the sockets 16 differ in diameters, as seen in Figs. II to IV, inclusive, this differentiation in the cavities being provided in order that the points of the plug to be hereinafter described may be introduced only into their proper sockets.

20 designates the shell of my plug which is composed of two sections that are flattened intermediate of the ends of the plug, as seen in Fig. V, and are provided with ears 21 located at the flattened portions of the sections, (see Fig. V,) the ears being connected by suitable means, such as rivets or bolts whereby the sections of the plug shell are held assembled.

22 is an insulating block located within the plug shell, and through which extend longitudinal openings. The openings in the insulating block receive the shanks of plug points of different diameters, to which are connected the electrical wires B that lead to the point to which electrical energy is to be conveyed from my junction box and receptacle. The plug points 23 are split longitudinally and they are, therefore, yielding in order that when they are introduced into the cavities in the sockets 16 mounted in the insulating block 14 of the receptacle, they will bear in close contact with the sockets. The plug points are made of different diameters to provide for their entrance individually into the particular sockets that are intended to receive them.

In the assembling of the members of my receptacle, the conductors are readily secured to the rear ends of the sockets 16 when said sockets are separated from the insulating block 14 that is intended to receive the sockets; and, after the sockets have been fitted into the insulating block, they are firmly secured therein by the application of the nuts 18 to the forward ends of the sockets, so that they will bear against the forward end of the insulating block.

As previously mentioned, the neck 10 of the housing cap 8 of my junction box is provided with a smooth and true bore into which the shell 20 of the connection plug may be fitted, and the neck is, therefore, caused to serve as holder and guide for the plug, and into which the plug may be snugly fitted when it is inserted into the junction box. Therefore, the neck 10 serves to relieve the receptacle of strain, both in the introduction and removal of the plug.

I claim:—

1. In a device of the character described, the combination of a junction box body, a lid surmounting said body, a housing cap surmounting said lid, a receptacle mounted on said lid within said housing cap and provided with sockets, and a neck projecting from said housing cap in alinement with the said receptacle and adapted to receive a plug to be inserted into said receptacle.

2. A terminal plug receptacle having an insulating block provided with recesses and with electrode sockets, and a two-part supporting casing therefor having inwardly projecting portions fitting said recesses in order to firmly secure the block to the casing.

3. A terminal plug receptacle having an insulating block provided with recesses and with electrode sockets of different sizes, and a two-part supporting casing therefor having inwardly projecting portions fitting said recesses in order to firmly secure the block to the casing.

Dated at St. Louis, Mo., November 21, 1908.

WILLIAM A. HOPKINS.

In presence of—
G. H. KNIGHT,
H. G. COOK.